(12) United States Patent (10) Patent No.: US 12,596,424 B2

Le Coq (45) Date of Patent: Apr. 7, 2026

(54) METHOD FOR MANAGING HIBERNATION OF AN EMBEDDED SYSTEM

(71) Applicant: STMicroelectronics International N.V., Geneva (CH)

(72) Inventor: Stephane Le Coq, Thorigné-Fouillard (FR)

(73) Assignee: STMicroelectronics International N.V., Geneva (CH)

(*) Notice: Subject to any disclaimer, the term of this patent is extended or adjusted under 35 U.S.C. 154(b) by 105 days.

(21) Appl. No.: 18/670,083

(22) Filed: May 21, 2024

(65) Prior Publication Data

US 2024/0427408 A1     Dec. 26, 2024

(30) Foreign Application Priority Data

Jun. 20, 2023     (FR) ...................................... 2306353

(51) Int. Cl.
| | |
|---|---|
| *G06F 1/00* | (2006.01) |
| *G06F 1/3234* | (2019.01) |
| *G06F 1/3287* | (2019.01) |

(52) U.S. Cl.
CPC .......... *G06F 1/3275* (2013.01); *G06F 1/3287* (2013.01)

(58) Field of Classification Search
CPC .... G06F 1/3275; G06F 1/3287; G06F 1/3203; G06F 1/3234; G06F 1/3246; G06F 9/4418
See application file for complete search history.

(56) References Cited

U.S. PATENT DOCUMENTS

| | | | | |
|---|---|---|---|---|
| 11,886,266 | B2 * | 1/2024 | Wang | G06F 3/0659 |
| 2004/0230851 | A1 * | 11/2004 | Chao | G06F 9/4418 |
| | | | | 713/320 |
| 2008/0295531 | A1 * | 12/2008 | Song | F24F 11/66 |
| | | | | 62/157 |
| 2014/0359224 | A1 * | 12/2014 | Bisht | G06F 1/3203 |
| | | | | 711/129 |
| 2015/0039922 | A1 | 2/2015 | Chalhoub et al. | |
| 2016/0320826 | A1 * | 11/2016 | Taha | G11C 14/0054 |
| 2017/0177870 | A1 | 6/2017 | Hildebrand | |
| 2019/0286219 | A1 * | 9/2019 | Anazawa | G06F 3/068 |
| 2021/0271412 | A1 * | 9/2021 | Cheong | G06F 3/0679 |
| 2022/0300173 | A1 * | 9/2022 | Malik | G06F 12/0238 |
| 2022/0317757 | A1 * | 10/2022 | Rao | G06F 1/3206 |

* cited by examiner

*Primary Examiner* — Xuxing Chen
(74) *Attorney, Agent, or Firm* — Slater Matsil, LLP

(57) ABSTRACT

The present disclosure relates to a method for managing the deep sleep mode of an embedded system. In embodiments, the method includes determining a value of the electrical charge used, during a deep sleep mode of the system, for saving software-context data into a non-volatile memory of the system; determining a value of a current used, during a deep sleep mode of the system, for saving software-context data into a volatile memory of the system; determining, from the previously determined values, a threshold value defining a duration beyond which a power consumption caused by saving software-context data into the non-volatile memory is less than that into the volatile memory; saving the software-context data into the non-volatile or volatile memory according to the expected duration of deep sleep mode of the system.

20 Claims, 3 Drawing Sheets

METHOD FOR MANAGING HIBERNATION OF AN EMBEDDED SYSTEM

CROSS-REFERENCE TO RELATED APPLICATIONS

This application claims the benefit of French Patent Application No. 2306353, filed on Jun. 20, 2023, which application is hereby incorporated by reference herein in its entirety.

TECHNICAL FIELD

The present description generally relates to an embedded system's deep sleep mode.

BACKGROUND

An embedded system is an autonomous electronic and computer system intended to carry out one or more specific tasks inside an apparatus, such as a vehicle or a connected object, in which it is embedded. Minimizing power consumption for numerous embedded systems is a key point to be managed. When the embedded system is active, all the system's memories are available, power supplied, and timed with clock signals. The system software normally runs, and its execution context, the set of data used by the tasks executed by the software (such as the data present in the stacks, in the registers, or the timer data), are continuously updated.

The latter can be set in deep sleep mode to reduce the system's power consumption. In this mode, most system components are no longer supplied power, especially the one or more cores of the system. Only a few elements remain power supplied, such as the real-time clock and the wake-up block. The duration of this deep sleep mode varies, for example, between 10 seconds and 213 days with many possible values, such as 1 hour, 2 hours, 1 day, etc., in the case of an embedded system communicating according to a NB-IoT (NarrowBand Internet-of-Things) protocol.

Before the deep sleep mode, some data stored in the system, called software-context, such as the data present in stacks, in registers, or the timer data, should be saved when leaving this deep sleep mode of the system to allow a resumption of the execution of the tasks of the system from the point at which the same where cut off by entering the deep sleep mode.

The first option consists of saving these software-context data in the system's random-access memory (RAM). Since the system RAM is volatile during the deep sleep mode, it is weakly powered by a dedicated regulator so that the data remains statically stored in the RAM. The current needed to maintain the data is responsive to the RAM's temperature.

A second option consists of saving these software-context data in the system's Flash memory. To perform this saving, the Flash memory should first undergo a step of erasing the data stored therein. Erasing the data stored in the Flash memory and writing the data of software-context implies a high current consumption and requests some time to be performed. Further, a Flash memory has a limited number of write/erase cycles before its reliability is impacted. Lastly, managing the locations of the data inside the Flash memory requires a file system, which can be complex.

SUMMARY

A solution that addresses the issues encountered with existing solutions is advantageous.

A specific embodiment address at least a part of these issues, and provides method for managing a deep sleep mode of an embedded system, comprising at least the steps of determining an electric charge value $Conso_{Non\_Vola}$ intended to be used, during a deep sleep mode of the embedded system, for a possible saving of software-context data in a non-volatile memory of the embedded system; determining a current value $Courant_{Sauv\_Vola}$ intended to be used, during a deep sleep mode of the embedded system, for a possible saving of software-context data in a volatile memory of the embedded system, at a first temperature; determining, based on the previously determined electric charge $Conso_{Non\_Vola}$ and current $Courant_{Sauv\_Vola}$ values, a threshold value $Seuil_{Conso}$ defining a duration beyond which a power consumption intended to be caused by the possible saving of software-context data into the non-volatile memory is less than that intended to be caused by the possible saving of software-context data into the volatile memory; saving the software-context data into the non-volatile memory when an expected duration of deep sleep mode of the embedded system is higher than the previously determined threshold value $Seuil_{Conso}$, or in the volatile memory when the expected duration of deep sleep mode is less than or equal to the previously determined threshold value $Seuil_{Conso}$.

According to a specific embodiment, the electric charge value $Conso_{Non\_Vola}$ intended to be used for a possible saving of software-context data in the non-volatile memory is expressed in Coulomb and determined by the equation: $Conso_{Non\_vola}=(Courant_{Prog\_Non\_Vola} \times d_{Prog\_Non\_Vola})+(Courant_{Eff\_Non\_Vola} \times d_{Eff\_Non\_Vola})+(Courant_{Copie\_Non\_Vola} \times d_{Copie\_Non\_Vola})$, where $Courant_{Prog\_Non\_Vola}$: value of the current used to program the non-volatile memory, in Ampere; $d_{Prog\_Non\_Vola}$: duration of programming the non-volatile memory, in second, $Courant_{Eff\_Non\_Vola}$: value of the current used to erase a part of the non-volatile memory, in Ampere; $d_{Eff\_Non\_Vola}$: duration of erasing a part of the non-volatile memory, in second; $Courant_{Copie\_Non\_Vola}$: value of the current used to copy the software-context data into the non-volatile memory, in Ampere; and $d_{Copie\_Non\_Vola}$: duration of copying the software-context data into the non-volatile memory, in second.

According to a specific embodiment, the threshold value $Seuil_{Conso}$ is determined by the equation:

$$Seuil_{Conso} = \frac{Conso_{Non\_Vola}}{Courant_{Sauv\_Vola}}.$$

According to a specific embodiment, saving the software-context data into the non-volatile memory is further under condition that the expected duration of deep sleep mode is less than or equal to a minimum duration of deep sleep mode $d_{min}$ guarantying a desired lifetime of the non-volatile memory and expressed by the equation:

$$d_{Min} = \frac{d_{Vie} \times 365 \times 24 \times 3600 \times Taille_{Contexte}}{N_{Max\_Cycles} \times Taille_{Mémoire\_Libre}},$$

where $d_{Vie}$: desired lifetime of the non-volatile memory, in year; $Taille_{Contexte}$: size of the software-context data; $N_{Max\_Cycles}$: theoretical maximum number of write/erase cycles of the non-volatile memory before its deterioration; and $Taille_{Mémoire\_Libre}$: size of the free memory into the non-volatile memory.

In a specific embodiment, saving the software-context data into the non-volatile memory is further under condition that the value of a factor $N_{cycles\_vie}$ defined by the equation:

$$N_{Cycles\_Vie} = N_{Cycles\_Compteur} \times \frac{Taille_{Contexte}}{Taille_{Mémoire\_Libre}}$$

is less than the theoretical maximum number of write/erase cycles of the non-volatile memory before its deterioration, where $N_{Cycles\_Compteur}$: number of write/erase cycles already undergone by the non-volatile memory; $Taille_{Contexte}$: Size of the software-context data; and $Taille_{Mémoire\_Libre}$: size of free memory into the non-volatile memory.

According to a specific embodiment, saving the software-context data into the non-volatile memory includes implementing the following steps programming a flag $D_{Non\_Vola}$ indicating that saving the software-context data is performed into the non-volatile memory; determining a start-of-writing address into the non-volatile memory; writing software-context data into the non-volatile memory, from the previously determined start-of-writing address; subtracting, from the expected duration of deep sleep mode of the embedded system, a duration for implementing the preceding step of writing software-context data into the non-volatile memory; switching the power supply of the volatile memory off.

According to a specific embodiment, the method further includes exiting the deep sleep mode of the embedded system, including at least implementing the following steps reading the value of the flag $D_{Non\_Vola}$; if the value of the flag $D_{Non\_Vola}$ indicates that saving the software-context data was performed into the volatile memory, the embedded system is directly set at active state, or if the value of the flag $D_{Non\_Vola}$ indicates that saving the software-context data was performed into the non-volatile memory, the software-context data are read into the non-volatile memory from the start-of-writing address, and written into the volatile memory. Non-volatile memory blocks wherein the software-context data were saved are erased.

According to a specific embodiment, exiting the deep sleep mode of the embedded system further includes, before or after the step of reading the flag value, a step of resuming the power supply of the volatile memory.

According to a specific embodiment, exiting the deep sleep mode of the embedded system further includes, before the step of reading the value of the flag $D_{Non\_Vola}$, a step of determining a reason for exiting the deep sleep mode of the embedded system, then if exiting the deep sleep mode is due to a reset of the embedded system, an initial startup of the embedded system, a software update via FOTA, or a watchdog event, the embedded system is directly set in active state without reading the value of the flag, or if exiting the deep sleep mode is not due to a reset of the embedded mode, an initial startup of the embedded system, a software update via FOTA, nor a watchdog event, reading the flag value is implemented.

According to a specific embodiment, one provides an embedded system comprising means for implementing the hereinabove method.

According to a specific embodiment, the non-volatile memory is a Flash memory, and the volatile memory is a RAM.

According to a specific embodiment, one provides a computer program product storing therein instructions which, when the program is executed by an embedded system, causes it to implement the hereinabove method.

According to a specific embodiment, one provides a computer-readable medium storing instructions that, when the program is executed by an embedded system, cause it to implement the method hereinabove.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For clarity, only the operations and elements useful for an understanding of the embodiments described herein have been illustrated and described in detail. In particular, the encoding needed to implement the different steps of the method for managing the deep sleep mode of the embedded system is not described in detail. Those skilled in the art will be able to implement the different functions of the method in detail based on the functional description provided herein.

Unless indicated otherwise, when two elements are connected together, this signifies a direct connection without any intermediate elements other than conductors, and when two elements are coupled together, this signifies that these two elements can be connected or coupled via one or more other elements.

Unless specified otherwise, the expressions "around," "approximately," "substantially," and "in the order of" signify within 10% and preferably within 5%.

Figure 1:
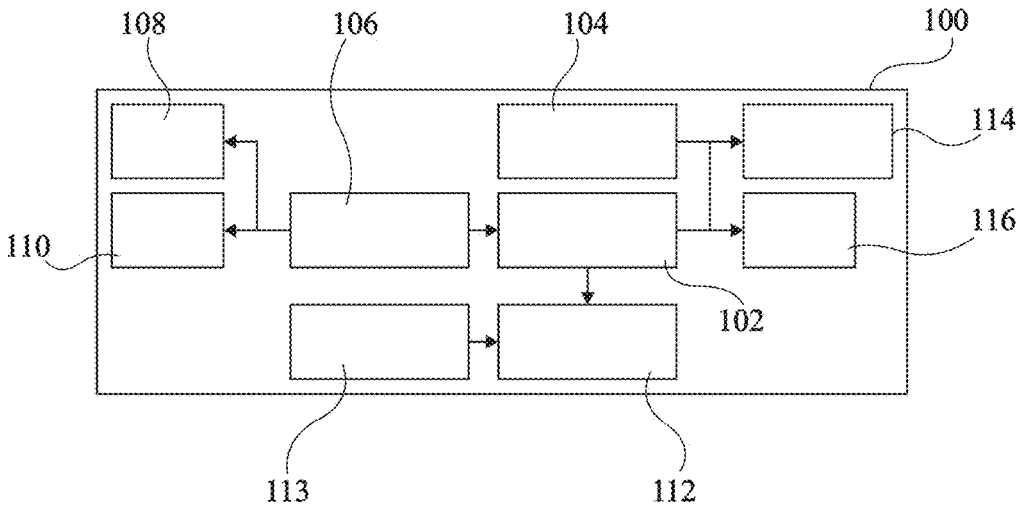
FIG. 1 schematically illustrates an example embodiment of an embedded system in which a method for managing a deep sleep mode of the system is implemented.

An example embodiment of an embedded system 100 implementing a method for managing a deep sleep mode described hereinabove is illustrated in FIG. 1. In FIG. 1, only some elements of the system 100 are illustrated and described hereinafter.

In the example described here, the embedded system 100 communicates according to an NB-IoT protocol. It can be embedded in NB-IoT devices, for which managing power consumption is a key point.

According to this example embodiment, system 100 includes a first core 102, or central circuit, which manages the security features and drives the other elements of system 100.

According to this example embodiment, system 100 also includes a second core 104, or central circuit, which performs the different functions, applications, or tasks performed by system 100. The second core 104, for example, manages the IP, MQTT, TLS, etc. protocols. It can also manage simple functions such as measurements.

The system 100 according to this example embodiment also includes a third core 106, or central circuit, managing and performing the communications of the system 100 with the external environment. The third core 106 is coupled with one or more memories, which in the present example correspond to a first volatile memory 108 (for example, a RAM), and to a first non-volatile memory 110 (for example, a Flash memory), and also to the first core 102.

According to this example embodiment, system 100 includes a power supply managing unit 112 driven by the first core 102 and coupled with an RTC (Real Time Clock) block 113.

According to this example embodiment, the system 100 also includes a second volatile memory 114, such as a so-called retention RAM (also called RETRAM), and a second non-volatile 116 (such as a Flash memory) coupled with the first and second cores 102, 104.

Alternatively, the architecture of system 100 can be different from that described and illustrated in FIG. 1. It can include supplementary circuits or elements or not include some of the previously described elements or circuits.

Further, the elements of system 100 can be different from those described above. For example, the first RAM 108 and/or the second RAM 114 can correspond to another type of volatile memory. According to another example, the first Flash memory 110 and/or the second Flash memory 114 can correspond to another type of non-volatile memory, for example, the EEPROM (Electrically Erasable Programmable Read-Only Memory) type.

Figure 2:
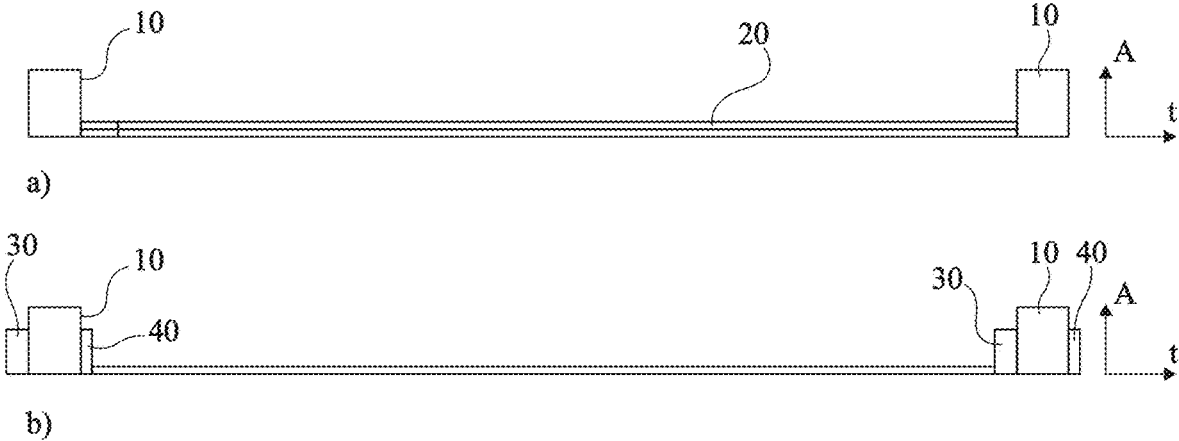
FIG. 2 schematically illustrates an example of current consumptions of a volatile memory and of a non-volatile memory upon a triggering between an active mode and a deep sleep mode in which one of these memories is used in saving software-context data.

FIG. 2 schematically illustrates the current consumption of volatile and non-volatile memory of an embedded system during different consecutive phases (active mode and deep sleep mode). In this schematic figure, the durations of the different phases, and the magnitudes of the currents used during these different phases are not shown to scale with respect to each other.

Scheme a) of FIG. 2 illustrates the evolution over time of the intensity of an electric current used by the second volatile memory 114 of the system 100 during different phases of use of the system 100. Reference 10 designates the current used by the second volatile memory 114 when system 100 is in active mode (two separate phases of active mode are illustrated in FIG. 2). Reference 20 designates the current used when system 100 is in deep sleep mode (between the two active mode phases) with saving the software-context data into the second volatile memory 114.

Scheme b) of FIG. 2 illustrates the evolution over time of the intensity of an electric current used by the second non-volatile memory 116 of the system 100 during different phases of use of the system 100. Like in scheme a), reference 10 designates the current used by the second non-volatile memory 116 when system 100 is in active mode. Reference 30 designates the current used by the second non-volatile memory 116 during the erasing of a part of its blocks, such an erasing being performed upon triggering from a deep sleep mode to an active mode of the system 100. Reference 40 designates the current used by the second non-volatile memory 116 during writing software-context data into the same before the definitive entry of the system 100 in deep sleep mode.

Thus, schemes a) and b) in FIG. 2 illustrate the fact that, when the software-context data are saved into the second volatile memory 114, the energy consumption associated with this saving corresponds to the current consumed by the memory during the deep sleep mode (designated with reference 20 in scheme a) of FIG. 2), while, when the software-context data are saved into the second non-volatile memory 116, the energy consumption associated with this saving corresponds to the current consumed by the memory during the erase and write operations implemented in it just before the deep sleep mode, and at the end of the same (corresponding to the consumptions designated with the references 30 and 40 in scheme b) of FIG. 2).

Figure 3:
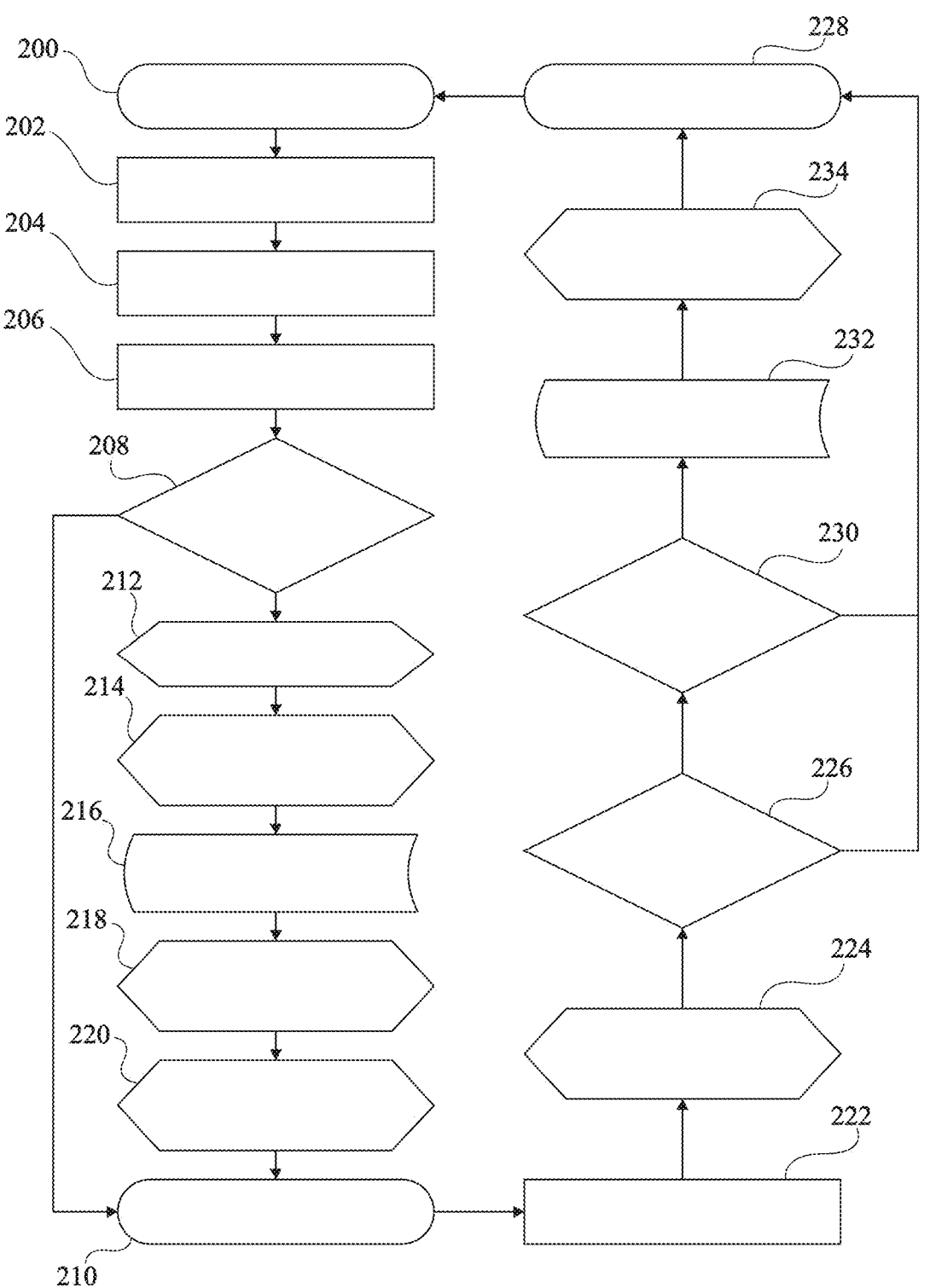
FIG. 3 schematically illustrates the steps of an example method for managing the deep sleep mode of an embedded system.

FIG. 3 schematically illustrates the steps of an example method for managing the deep sleep mode of system 100, performing the saving of the software-context data of system 100 into the second volatile memory 114 or into the second non-volatile memory 116 depending on the power consumption involved by saving the data in each of them.

In this example, the method starts while the system 100 is in active mode, and that exiting this active mode is launched (step 200).

In the next step 202, an electric charge value $\text{Conso}_{Non\_Vola}$ intended to be used, during a deep sleep mode of the system 100, during a possible saving of the software-context data into a non-volatile memory of the system 100, which corresponds, considering the example system 100 previously described in relation with FIG. 1, to the second non-volatile memory 116 of the system 100, is determined. In an example-specific embodiment, this electric charge value $\text{Conso}_{Non\_Vola}$, expressed in Coulomb, is determined by the equation: $\text{Conso}_{Non\_vola}=(\text{Courant}_{Prog\_Non\_Vola}\times d_{Prog\_Non\_Vola})+(\text{Courant}_{Eff\_Non\_Vola}\times d_{Eff\_Non\_Vola})+(\text{Courant}_{Copie\_Non\_Vola}\times d_{Copie\_Non\_Vola})$.

The factor $\text{Courant}_{Prog\_Non\_Vola}$ corresponds to the value of the current used to program the non-volatile memory 116, in Ampere. The factor $d_{Prog\_Non\_Vola}$ corresponds to the duration of programming the non-volatile memory 116, in second. The factor $\text{Courant}_{Eff\_Non\_Vola}$ corresponds to the value of the current used to erase a part of the non-volatile memory 116, in Ampere. The factor $d_{Eff\_Non\_Vola}$ corresponds to the duration of erasing a part of the non-volatile memory 116, in second. The factor $\text{Courant}_{Copie\_Non\_Vola}$ corresponds to the value of the current used to copy the software-context data into the non-volatile memory 116, in Ampere. The factor $d_{Copie\_Non\_Vola}$ corresponds to the duration of copying the software-context data into the non-volatile memory 116, in second.

Thus, the electric charge value $\text{Conso}_{Non\_Vola}$ corresponds to the sum of the electric charges intended to be used by the non-volatile memory 116 during programming, erasing, and writing operations. As an example, this electric charge value $\text{Conso}_{Non\_Vola}$ can be comprised between 630.8 μC (minimum value obtained considering the minimum durations for programming, erasing, and copying data into the non-volatile memory 116) and 1261.6 μC (maximum value obtained considering the maximum durations for programming, erasing, and copying data into the non-volatile memory 116), and it is possible to select, for the electric charge value $\text{Conso}_{Non\_Vola}$, an average value comprised between these minimum and maximum values. This electric charge value $Conso_{Non\_Vola}$ can be determined based on measurements that are not repeated upon each exit from the active mode of the embedded system 100.

Figure 4:
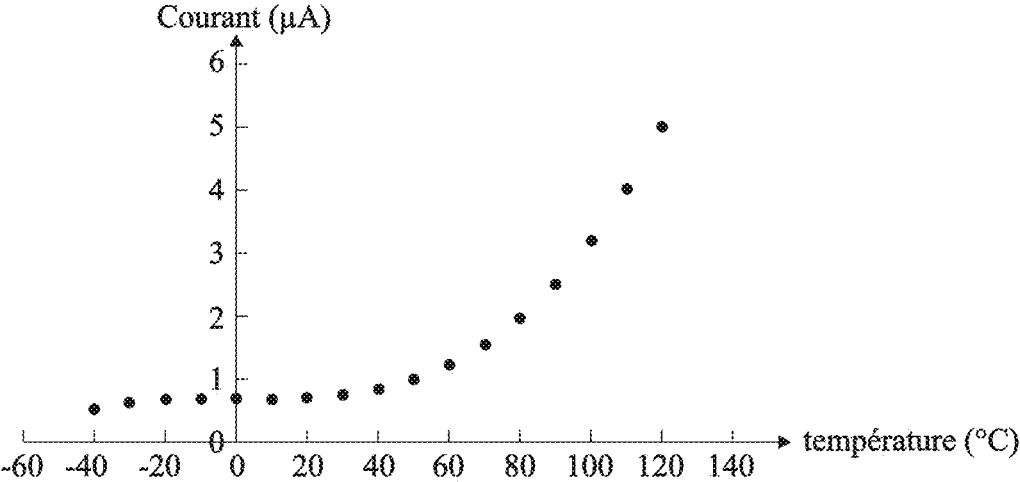
FIG. 4 illustrates, for different temperatures, the value of a current intended to be used, upon a deep sleep mode of an embedded system, for a possible saving of software-context data into a volatile memory of the embedded system.

After the hereinabove described step 202, a value of a current called $Courant_{Sauv\_Vola}$, and intended to be used, during a deep sleep mode of the system 100, for a possible saving of the software-context data into a volatile memory of the system 100, is determined, for a first temperature (step 204). This volatile memory of system 100 corresponds, in view of the example system 100 previously described in relation with FIG. 1, to the second volatile memory 114 of system 100. This current value $Courant_{Sauv\_Vola}$ can be determined using a curve, or preset measurement points of this current for different temperature values, as illustrated in FIG. 4. As an example, for a first temperature equal to 25° C., the current value $Courant_{Sauv\_Vola}$ can be equal to 0.7° µA (this value includes, in this example, the current consumed by the voltage regulator allowing the power supply of the volatile memory to be provided during the deep sleep mode of the embedded system, and the current leakages observed during this deep sleep mode).

During a next step 206, based on the previously determined electric charge $Conso_{Non\_Vola}$ and current $Courant_{Sauv\_Vola}$ values, a threshold value $Seuil_{Conso}$ defines a duration beyond which a power consumption intended to be caused by the possible saving of software-context data into the non-volatile memory 116 of the system 100 is less than that intended to be caused by the possible saving of software-context data into the volatile memory 114 of the embedded system 100 is determined. According to an example specific embodiment, the threshold value $Seuil_{Conso}$ expressed in second, is determined by the equation:

$$Seuil_{Conso} = \frac{Conso_{Non\_Vola}}{Courant_{Sauv\_Vola}}.$$

Figure 5:
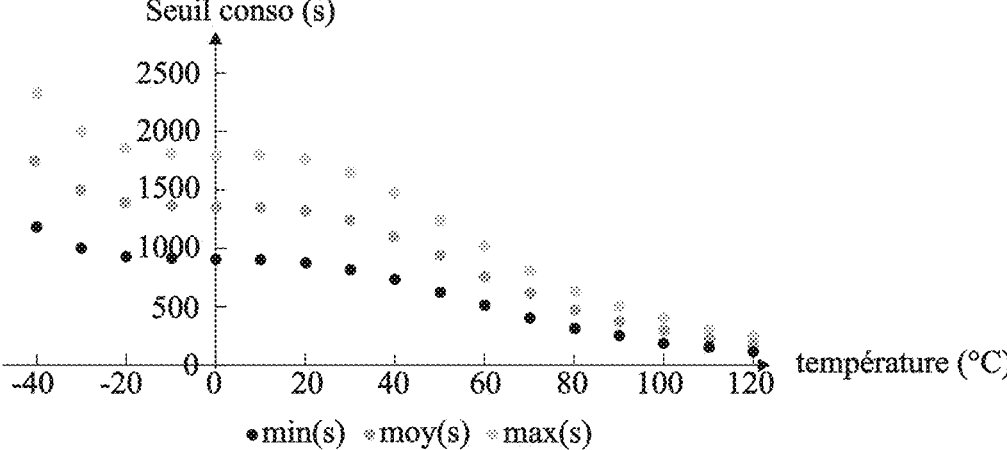
FIG. 5 illustrates, for different temperatures, threshold values defining a duration beyond which a power consumption intended to be caused by a possible saving of software-context data into the non-volatile memory of the system is less than that intended to be caused by a possible saving of software-context data into the volatile memory of the embedded system.

Given the current value $Courant_{Sauv\_Vola}$ depending on the temperature, the threshold value $Seuil_{Conso}$ also depends on the temperature. FIG. 5 illustrates example threshold values $Seuil_{Conso}$ obtained considering the minimum values of the electric charge $Conso_{Non\_Vola}$ (corresponding to points having, for a given temperature, the lowest values), the maximum values of the electric charge $Conso_{Non\_Vola}$ (corresponding to points having, for a given temperature, the highest values), and the average values of the electric charge $Conso_{Non\_Vola}$ (corresponding to points having, for a given temperature, the values located between the low and high values).

In a next step 208, one determines whether saving the software-context data is performed into the non-volatile memory 116 when an expected duration of the deep sleep mode of the embedded system is higher than the threshold value $Seuil_{Conso}$, or into the volatile memory 114 when the expected duration of the deep sleep mode of the embedded system is less than or equal to the threshold value $Seuil_{Conso}$.

When it is determined that saving the software-context data is performed into the volatile memory 114, the system 100 can directly go to deep sleep mode (step 210). In such cases, saving the software-context data into volatile memory 114 consists of keeping this memory poorly powered, given that the software-context data are already in volatile memory 114.

When it is determined that saving the software-context data is performed into the non-volatile memory 116, the following steps can be implemented by programming a flag $D_{Non\_Vola}$ indicating that saving the software-context data is performed into the non-volatile memory (step 212); determining, or calculating, a start-of-writing address in the non-volatile memory 116 (step 214); writing the software-context data into the non-volatile memory 116, from the previously determined start-of-writing address (step 216); subtracting, from the expected duration of the deep sleep mode of the system 100, a duration of implementing the preceding step of writing the software-context data into the non-volatile memory 116 (step 218); stopping the power supply of the volatile memory 114 (step 220).

After these steps, system 100 can enter deep sleep mode (step 210).

Upon exiting this deep sleep mode of the system 100 (step 220), the following steps can be implemented resuming the power supply of the volatile memory 114 (step 224); determining a reason for exiting the deep sleep mode of the system 100 (step 226), then if exiting the deep sleep mode is due to a reset of the system 100, an initial startup of the system 100, a software update via FOTA (Firmware Over-The-Air), or a watchdog event, the system 100 is directly set at active state (step 228) without reading the value of the flag DNon_Vola, or if exiting the deep sleep mode is not due to a reset of the system 100, an initial startup of the system 100, a software update via FOTA, or a watchdog event, reading the value of the flag DNon_Vola is implemented (step 230).

If the value of the flag DNon_Vola indicates that saving the software-context data was performed into the volatile memory 114, the system 100 is directly set at active state (step 228). Or, if the value of the flag $D_{Non\_Vola}$ indicates that saving the software-context data was performed into the non-volatile memory 116, the software-context data are read from the non-volatile memory 116 starting from the start-of-writing address, and written into the volatile memory 114 (step 232), then blocks of the non-volatile memory 116 wherein the software-context data were saved, are erased (step 234).

Alternatively, it is possible that the step 224 of resuming the power supply of the volatile memory 114 is implemented after reading the flag value $D_{Non\_Vola}$, this resumption of the power supply of the volatile memory 114 occurring when saving the software-context data was performed into the non-volatile memory 116, and prior writing the software-context data into the volatile memory 114.

In the preceding example, updating the embedded system 100 can be done remotely via FOTA technology. The part of the memory 112 reserved for these updates can be used to save the software-context data.

In the above-described method, selecting the memory into which saving the software-context data is performed, is determined by comparing an expected duration of deep sleep mode of the system 100 with a threshold value defining a duration beyond which a power consumption intended to be caused by the possible saving of software-context data into the non-volatile memory 116 of the system 100 is less than that intended to be caused by the possible saving of software-context data into the volatile memory 114 of the system 100.

According to a first alternative of the hereinabove described method, it is possible that saving the software-context data into the non-volatile memory is under condition that, further to the previously discussed threshold value $Seuil_{Conso}$, the expected duration of the deep sleep mode is less than or equal to a minimum duration of the deep sleep mode $d_{Min}$ guarantying a desired lifetime of the non-volatile memory 116. This minimum duration $d_{Min}$ can be expressed by the equation $$d_{Min} = \frac{d_{Vie} \times 365 \times 24 \times 3600 \times \text{Taille}_{Contexte}}{N_{Max\_Cycles} \times \text{Taille}_{Mémoire\_Libre}},$$

where $d_{Vie}$: desired lifetime of the non-volatile memory 116, in year; $\text{Taille}_{Contexte}$: size of the software-context date; $N_{Max\_Cycles}$: theoretical maximum number of write/erase cycles of the non-volatile memory 116 before its deterioration; $\text{Taille}_{Mémoire\_Libre}$: size of the free memory into the non-volatile memory 116.

As an example, the value of the factor $N_{Max\_Cycles}$ is between 10,000 and 100,000.

According to a second alternative, saving the software-context data into the non-volatile memory 116 can be under condition that the value of a factor $N_{Max\_Cycles}$ defined by the equation $$N_{Cycles\_Vie} = N_{Cycles\_Compteur} \times \frac{\text{Taille}_{Contexte}}{\text{Taille}_{Mémoire\_Libre}}$$

is less than the theoretical maximum number of write/erase cycles of the non-volatile memory 116 before its deterioration, where $N_{Cycles\_Compteur}$: number of write/erase cycles already performed by the non-volatile memory 116; $\text{Taille}_{Contexte}$: size of the software-context data; $\text{Taille}_{Mémoire\_Libre}$: size of the free memory into the non-volatile memory 116.

The previously described first and second alternatives can be combined with each other, saving the software-context data into the non-volatile memory 116 being in such case under condition that the three hereinabove discussed criteria are met.

The non-volatile memory 116 can correspond to a Flash memory internal to the system 100, or can correspond to a Flash memory external to the system 100, and coupled with the latter.

In all the previously described examples, a saving of the software-context data into the non-volatile memory 116 can be performed using a file system of the non-volatile memory 116, or using a register having a size adapted to the size of the software-context data present into the block RTC 113 for storing the value of the flag $D_{Non\_Vola}$, as well as for storing the start-of-writing address of the software-context data in the non-volatile memory 116.

Implementing this method allows as compared to existing solutions, the current consumption when the system implementing it is set in deep sleep mode to be reduced.

The hereinabove described method can be advantageously implemented inside the embedded system for example a system on chip, or SoC, comprising a volatile memory such as a RAM, and a non-volatile memory such as a Flash memory. According to a specific example, the method can be implemented within an embedded system communicating according to a NB-IoT type protocol, such as the LTE cat NB1 protocol.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, concerning.

What is claimed is:

1. A method for managing a deep sleep mode in an embedded system, the method comprising:

determining an electrical charge ($\text{Conso}_{Non_{vola}}$) for storing software-context data in a non-volatile memory of the embedded system during the deep sleep mode;

determining a current ($\text{Courant}_{Sauv_{Vola}}$) for storing the software-context data in a volatile memory of the embedded system at a first temperature during the deep sleep mode;

determining a threshold based on the determined electrical charge and the current, the threshold defining a duration beyond which a first power consumption for storing the software-context data in the non-volatile memory is less than a second power consumption for storing the software-context data in the volatile memory;

storing the software-context data in the non-volatile memory in response to an expected duration of deep sleep mode being greater than the threshold; and storing the software-context data in volatile memory in response to the expected duration being less than or equal to the threshold.

2. The method according to claim 1, wherein the electrical charge ($\text{Conso}_{Non_{vola}}$) is expressed in Coulomb, and determined by the equation:

$$\text{Conso}_{Non_{vola}} = \left(\text{Courant}_{Prog_{Non_{Vola}}} \times d_{Prog_{Non_{Vola}}}\right) +$$
$$\left(\text{Courant}_{Eff_{Non_{Vola}}} \times d_{Eff_{Non_{Vola}}}\right) + \left(\text{Courant}_{Copie_{Non_{Vola}}} \times d_{Copie_{Non_{Vola}}}\right),$$

$$\text{Courant}_{Prog_{Non_{Vola}}}$$

where $$\text{Courant}_{Prog_{Non_{Vola}}}$$

is a current used to program the non-volatile memory in Amperes;

$$d_{Prog_{Non_{Vola}}}$$

is a duration for programming the non-volatile memory in seconds;

$$\text{Courant}_{Eff_{Non_{Vola}}}$$

is a current used to erase a part of the non-volatile memory in Amperes;

$$d_{Eff_{Non_{Vola}}}$$

<div style="display: flex; justify-content: space-between;"><span>11</span><span>12</span></div> is a duration for erasing a part of the non-volatile memory in seconds;

$$\text{Courant}_{Copie_{Non_{Vola}}}$$

is a current used to copy the software-context data into the non-volatile memory in Amperes; and $$d_{Copie_{Non_{Vola}}}$$

is a duration to copy the software-context data into the non-volatile memory in seconds.

3. The method according to claim 2, wherein the threshold is determined by the equation:

$$\text{Seuil}_{Conso} = \frac{\text{Conso}_{Non_{Vola}}}{\text{Courant}_{Sauv_{Vola}}}.$$

is the current for the software context data in the volatile memory.

4. The method according to claim 1, wherein storing the software-context data in the non-volatile memory is further under a condition that the expected duration of the deep sleep mode is less than or equal to a minimum duration of the deep sleep mode guarantying a desired lifetime of the non-volatile memory, the minimum duration expressed by the equation: minimum duration= $(d_{Life}\text{x}365\text{x}24\text{x}3600\text{xSize}_{Context})/(N_{Max\_Cycles}$ $\text{xSize}_{FreeMemory})$, where $d_{Life}$ is a desired lifetime of the non-volatile memory in years; $\text{Size}_{Context}$ is a size of the software-context data; $N_{Max\_Cycles}$ is a theoretical maximum number of write/erase cycles of the non-volatile memory before its deterioration; and $\text{Size}_{FreeMemory}$ is a free memory size of the non-volatile memory.

5. The method according to claim 1, wherein storing the software-context data in the non-volatile memory is further under condition that a factor defined by the equation:

$$N_{Cycles_{Vie}} = N_{Cycles_{Compteur}} \times \frac{\text{Taille}_{Contexte}}{\text{Taille}_{Mémoire_{Libre}}}$$

is less than a theoretical maximum number of write/erase cycles of the non-volatile memory before its deterioration, where $N_{CyclesCounter}$ is a number of write/erase cycles already performed by the non-volatile memory, $\text{Size}_{Context}$ is a size of the software-context data, and $\text{Size}_{FreeMemory}$ is a free memory size of the non-volatile memory.

6. The method according to claim 1, wherein storing the software-context data in the non-volatile memory comprises:

programming a flag indicating that software-context data is stored in the non-volatile memory;
    determining a start-of-writing address of the non-volatile memory;
    writing the software-context data in the non-volatile memory from the start-of-writing address;
    subtracting from the expected duration of the deep sleep mode a duration of writing the software-context data in the non-volatile memory; and
    switching the power supply of the volatile memory off.

7. The method according to claim 6, further comprising exiting the deep sleep mode, wherein exiting the deep sleep mode comprises:

reading the flag;
    directly setting the embedded system in an active state in response to the flag indicating that the software-context data is stored in the volatile memory; and
    reading the software-context data from the non-volatile memory starting from the start-of-writing address, writing the software-context data in the volatile memory, and erasing blocks of memory of the non-volatile memory storing the software-context data in response to the flag indicating that the software-context data is stored in non-volatile memory.

8. The method according to claim 7, wherein exiting the deep sleep mode further comprises resuming the power supply of the volatile memory before or after reading the flag.

9. The method according to claim 7, wherein exiting the deep sleep mode further comprises determining a reason for exiting the deep sleep mode of the embedded system before reading the flag, wherein the embedded system is directly set in the active state without reading the flag in response to exiting the deep sleep mode being due to a resetting of the embedded system, an initial startup of the embedded system, an over-the-air software update, or a watchdog event, and wherein the flag is read in response to exiting the deep sleep mode not related to the resetting of the embedded system, the initial startup of the embedded system, the over-the-air software update, or the watchdog event.

10. An embedded system configured to operate in a deep sleep mode, the embedded system comprising:

a non-volatile memory;
    a volatile memory; and
    a central circuit, the central circuit configured to:
        determine an electrical charge for storing software-context data in the non-volatile memory during the deep sleep mode,
        determine a current for storing the software-context data in the volatile memory of the embedded system at a first temperature during the deep sleep mode,
        determine a threshold based on the determined electrical charge and the current, the threshold defining a duration beyond which a first power consumption for storing the software-context data in the non-volatile memory is less than a second power consumption for storing the software-context data in the volatile memory,
        store the software-context data in the non-volatile memory in response to an expected duration of the deep sleep mode being greater than the threshold, and
        store the software-context data in the volatile memory in response to the expected duration being less than or equal to the threshold.

11. The embedded system of claim 10, wherein the non-volatile memory is a Flash memory, and wherein the volatile memory is a random-access memory.

12. The embedded system of claim 10, wherein the electrical charge ($\text{Conso}_{Non_{vola}}$) is expressed in Coulomb, and determined by the equation:

$$\text{Conso}_{Non_{Vola}} = \left(\text{Courant}_{Prog_{Non_{Vola}}} \times d_{Prog_{Non_{Vola}}}\right) +$$

-continued $$\left(\text{Courant}_{Eff_{Non_{Vola}}} \times d_{Eff_{Non_{Vola}}}\right) + \left(\text{Courant}_{Copie_{Non_{Vola}}} \times d_{Copie_{Non_{Vola}}}\right),$$

where $$\text{Courant}_{Prog_{Non_{Vola}}}$$

is a current used to program the non-volatile memory in Amperes;

$$d_{Prog_{Non_{Vola}}}$$

is a duration for programming the non-volatile memory in seconds;

$$\text{Courant}_{Eff_{Non_{Vola}}}$$

is a current used to erase a part of the non-volatile memory in Amperes;

$$d_{Eff_{Non_{Vola}}}$$

is a duration for erasing a part of the non-volatile memory in seconds;

$$\text{Courant}_{Copie_{Non_{Vola}}}$$

is a current used to copy the software-context data into the non-volatile memory in Amperes; and $$d_{Copie_{Non_{Vola}}}$$

is a duration to copy the software-context data into the non-volatile memory in seconds.

13. The embedded system of claim 12, wherein the threshold is determined by the equation:

$$\text{Seuil}_{Conso} = \frac{\text{Conso}_{Non_{Vola}}}{\text{Courant}_{Sauv_{Vola}}}.$$

Current$_{soft\_vol}$ is the current for storing the software cntext data in the volatile memory.

14. The embedded system of claim 10, wherein storing the software-context data in the non-volatile memory is further under a condition that the expected duration of the deep sleep mode is less than or equal to a minimum duration of the deep sleep mode guaranteeing a desired lifetime of the non-volatile memory, the minimum duration expressed by the equation: minimum duration= $(d_{Life} \times 365 \times 24 \times 3600 \times \text{Size}_{Context})/(N_{Max\_Cycles} \times \text{Size}_{FreeMemory})$, where $d_{Life}$ is a desired lifetime of the non-volatile memory in years; $\text{Size}_{Context}$ is a size of the software-context data; $N_{Max\_Cycles}$ is a theoretical maximum number of write/erase cycles of the non-volatile memory before its deterioration; and $\text{Size}_{FreeMemory}$ is a free memory size of the non-volatile memory.

15. The embedded system of claim 10, wherein storing the software-context data in the non-volatile memory is further under condition that a factor defined by the equation:

$$N_{Cycles_{Vie}} = N_{Cycles_{Compteur}} \times \frac{\text{Taille}_{Contexte}}{\text{Taille}_{M\acute{e}moire_{Libre}}}$$

is less than a theoretical maximum number of write/erase cycles of the non-volatile memory before its deterioration, where $N_{CyclesCounter}$ is a number of write/erase cycles already performed by the non-volatile memory, $\text{Size}_{Context}$ is a size of the software-context data, and $\text{Size}_{FreeMemory}$ is a free memory size of the non-volatile memory.

16. The embedded system of claim 10, wherein storing the software-context data in the non-volatile memory comprises:

programming a flag indicating that the software-context data is stored in the non-volatile memory;

determining a start-of-writing address of the non-volatile memory;

writing the software-context data in the non-volatile memory from the start-of-writing address;

subtracting from the expected duration of the deep sleep mode a duration of writing the software-context data in the non-volatile memory; and switching the power supply of the volatile memory off.

17. The embedded system of claim 16, further comprising exiting the deep sleep mode, wherein exiting the deep sleep mode comprises:

reading the flag;

directly setting the embedded system in an active state in response to the flag indicating that the software-context data is stored in the volatile memory; and reading the software-context data from the non-volatile memory starting from the start-of-writing address, writing the software-context data in the volatile memory, and erasing blocks of memory of the non-volatile memory storing the software-context data in response to the flag indicating that the software-context data is stored in non-volatile memory.

18. The embedded system of claim 17, wherein exiting the deep sleep mode further comprises resuming the power supply of the volatile memory before or after reading the flag.

19. The embedded system of claim 17, wherein exiting the deep sleep mode further comprises determining a reason for exiting the deep sleep mode of the embedded system before reading the flag, wherein the embedded system is directly set in the active state without reading the flag in response to exiting the deep sleep mode being due to a resetting of the embedded system, an initial startup of the embedded system, an over-the-air software update, or a watchdog event, and wherein the flag is read in response to exiting the deep sleep mode not related to the resetting of the embedded system, the initial startup of the embedded system, the over-the-air software update, or the watchdog event.

20. A non-transitory computer-readable media storing computer instructions, wherein the instructions, when executed by a processor, cause an embedded system to:

determine an electrical charge for storing software-context data in a non-volatile memory of the embedded system during a deep sleep mode;

determine a current for storing the software-context data in a volatile memory of the embedded system at a first temperature during the deep sleep mode;

determine a threshold based on the determined electrical charge and the current, the threshold defining a duration beyond which a first power consumption for storing the software-context data in the non-volatile memory is less than a second power consumption for storing the software-context data in the volatile memory;

store the software-context data in the non-volatile memory in response to an expected duration of the deep sleep mode being greater than the threshold; and store the software-context data in the volatile memory in response to the expected duration being less than or equal to the threshold.

* * * * *